United States Patent [19]

Sugiyama

[11] Patent Number: 5,103,307
[45] Date of Patent: Apr. 7, 1992

[54] INTERFRAME PREDICTIVE CODING/DECODING SYSTEM FOR VARYING INTERVAL BETWEEN INDEPENDENT FRAMES

[75] Inventor: Kenji Sugiyama, Noda, Japan

[73] Assignee: Victor Company of Japan, Ltd., Yokohama, Japan

[21] Appl. No.: 643,564

[22] Filed: Jan. 18, 1991

[30] Foreign Application Priority Data

Jan. 20, 1990 [JP] Japan .................................. 3-11063

[51] Int. Cl.⁵ ............................................ H04N 7/137
[52] U.S. Cl. ...................................... 358/136; 358/135
[58] Field of Search ................. 358/105, 133, 135, 136

[56] References Cited

U.S. PATENT DOCUMENTS

| | | | |
|---|---|---|---|
| 4,485,402 | 11/1984 | Searby | 358/136 |
| 4,982,285 | 1/1991 | Sugiyama | 358/135 |
| 4,985,768 | 1/1991 | Sugiyama | 358/135 |
| 4,999,704 | 3/1991 | Ando | 358/133 |

Primary Examiner—Victor R. Kostak
Attorney, Agent, or Firm—Michael N. Meller

[57] ABSTRACT

An efficient coding and decoding system is provided for a moving picture signal having independent and dependent frames. An interval between independent frames is varied in accordance with frame difference or amount of coded data. Predictive error signals are produced by subtracting predictive picture signals based on two of the frames, the interval therebetween thus varied, from picture signals of dependent frames. The predictive error picture signals and picture signals of the independent frames are then coded to produce a coded moving picture signal. When decoding, decoded predictive picture signals and predictive error picture signals are added to each other to reproduce the picture signals of the dependent frames. Decoded picture signals of the independent frames and the reproduced picture signals of the dependent frames are serially outputted to reproduce the original moving picture signal.

4 Claims, 4 Drawing Sheets

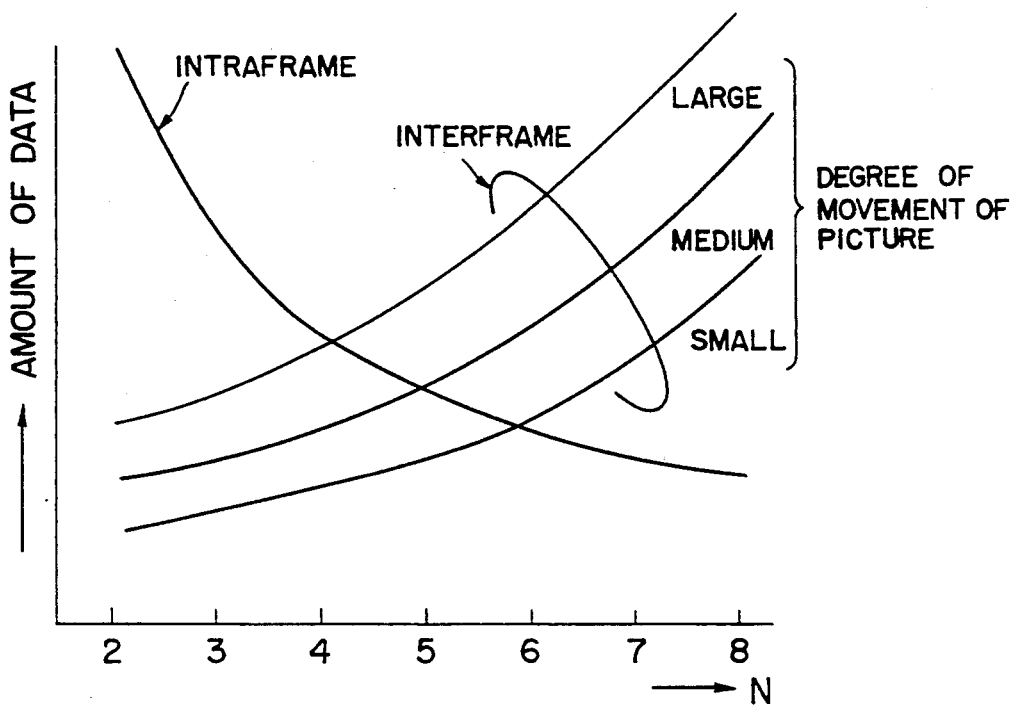
F I G. 1
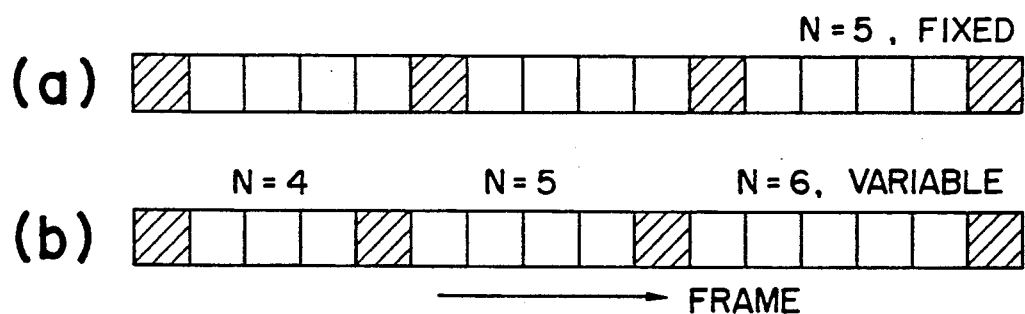
F I G. 2

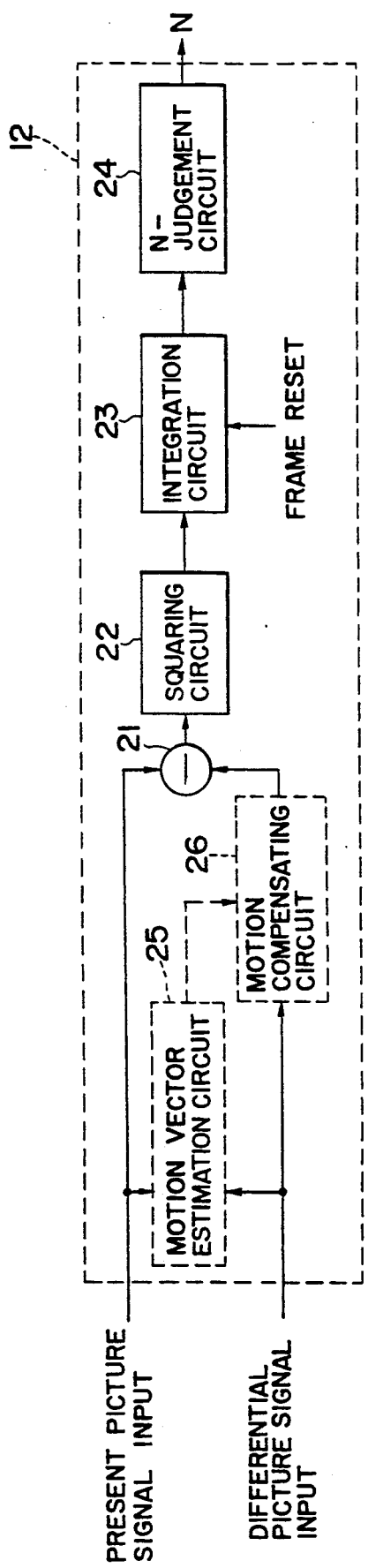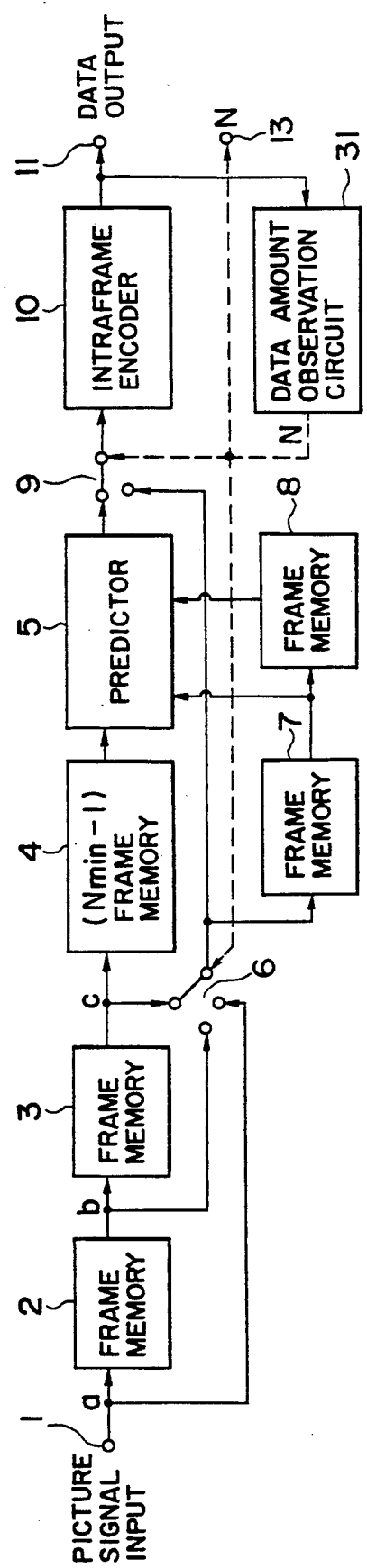

INTERFRAME PREDICTIVE CODING/DECODING SYSTEM FOR VARYING INTERVAL BETWEEN INDEPENDENT FRAMES

BACKGROUND OF THE INVENTION

The present invention relates to a coding system for efficiently coding a picture signal with lesser amount of codes in a recording apparatus, data transfer apparatus and display apparatus, etc., and a decoding system thereof, and particularly to an improvement of interframe predictive coding/decoding system.

Among efficient coding methods for coding a moving picture signal with less amount codes, an interframe predictive coding method utilizing interframe correlation is widely known, which is to predict a picture signal of a frame to be coded by means of a picture signal of a frame already coded to encode predictive error only on the basis of the fact that neighbouring frames of a moving picture usually resemble each other.

However, all prior data are required for decoding a picture signal of a frame in a conventional interframe predictive coding method of recursive-type using a picture signal of a prior frame because present data is composed of all the prior data.

Accordingly, there is no great inconvenience in the conventional method when picture signals relating to a television conference are succesively transferred, whereas in the case of storage media such as a recording disc and recording tape, it is required to reset interframe prediction at a few frames in order to decode a picture signal of any frame from any portion of the media by random access and search, etc. Particularly, in the case of visual search, decoding at every few frames is required so that it is desired to reset prediction at every decoding.

An independent frame to be independently coded where the prediction is reset includes larger amount of data to be produced than a dependent frame to be coded by interframe prediction, so that data-compression ratio is reduced compared to the case where the prediction is not reset.

On the other hand, in the case of reverse reproduction in which picture signals are conversely reproduced on the time base against normal reproduction, decoding cannot be performed in the conventional prediction by means of a prior frame because a prediction signal for decoding is not obtained.

Furthemore, the prediction by means of a prior frame is one-way prediction on the time base so that prediction efficiency is deteriorated, particularly in the case of scene change in which a picture is greatly changed, proper prediction cannot be performed.

The prediction signal must be obtained by the same decoder used in a decoding system so that decoding process is required in a coding system, then the system becomes large-scale, i.e., expensive and bulky.

Furthermore, if there is deference in computation accuracy of decoding process, there is also deference generated in prediction signals and the difference is accumlated.

In order to solve the above problems, the inventor of this application has already proposed an interframe predictive encoding system (hereinafter called prior application) for improving prediction efficiency and data compression ratio by effectively utilizing independent frames in a Japanese Patent Laid-Open No. 1990-192378 which corresponds to U.S. patent application Ser. No. 07/465,747 filed on Jan. 18, 1990.

The prior application discloses that independent frames are preliminarily set by a constant number of frames for coding and frames located between two independent frames are coded by prediction using prior and posterior (old and new) frames.

Therefore, in storage media, random access can be performed by every independent frame so that visual search is made possible without loss of data and prediction adapting to variation of pictures is also made possible. This results in improvement of S/N ratio of a prediction signal and prediction efficiency.

Furthemore, coded data thus obtained are symmetrically arranged on the time base, so that reverse reproduction can be easily performed.

In the above mentioned prior application, when movement of pictures is small, preferable prediction is possible even if a reset interval N is large or interval of independent frames is large. Thus, it is desirable to fewer make N large so as to make independent frames which produce a large amount of data.

However, prediction is not performed correctly if the reset interval N is large when the movement of picture is large so that amount of data produced in dependent frames which are coded by prediction based on prior and posterior independent frames is increased. Accordingly, the reset interval N in which amount of data is minimum depends on degree of movement of pictures.

This is because this coding method is to directly predict an interframe on the basis of prior and posterior independent frames so that interframe prediction efficiency is improved as the reset interval N is decreased.

FIG. 1 shows overall variation of the amount of coded data due to intraframe and interframe coding corresponding to the reset interval N or degree of movement of pictures under the condition that picture quality in the independent and dependant frames is constant.

Amount of data per frame coded with intraframe coding is almost constant without respect to N or the degree of movement of picture, so that entire amount of data is in inverse proportion to N.

On the other hand, the amount of data per frame coded with interframe coding is increased as N is increased as is the degree of movement of picture. According to FIG. 1, it is understood that N in which the entire amount of data is minimum depends on the degree of movement of picture.

SUMMARY OF THE INVENTION

An object of the present invention is to provide an interframe predictive coding system and decoding system in which interframe prediction efficiency is improved with less amount of coded data and always suitable coding is performed with respect to moving pictures in which degree of movement of pictures is varying.

According to the present invention there is provided an interframe coding system for a moving picture signal composed of serial frames which are independent frames objective to intraframe coding and dependent frames to interframe coding.

The system comprises varying means for varying an interval of the independent frames, prediction means for producing a predictive picture signal on the basis of two independent frames located before and after among the independent frames and subtracting the predictive picture signal and a picture signal of a dependent frame to be predicted among the dependent frames from each other to produce a predictive error picture signal, and interframe coding means for coding the picture signal of the independent frame and the predictive error picture signal.

The varying means comprises detection means for subtracting picture signals of two frames among the frames from each other to detect a frame difference value and adjusting means for comparing a preset reference value and the frame difference value with each other to widen the interval if the former is greater than the latter and narrow the interval if the former is smaller than the latter.

The varying means further comprises adjusting means for comparing a preset reference value and ratio of amount of data obtained by coding the predictive error picture signal to amount of data obtained by coding the picture signal of the independent frame and to narrow the interval if the former is greater than the latter and widen the interval if the former is smaller than the latter.

Further provided is a decoding system which comprises decoding means for decoding the data to reproduce a picture signal of the independent frame and predictive error picture signal, inverse predictive means for producing a predictive picture signal on the basis of two independent frames located before and after among the independent frames and adding the predictive picture signal and predictive error picture signal to each other to reproduce a picture signal of the dependent frame, and reproduction means for serially outputting the picture signal of the independent frame and the reproduced picture signal of the dependent frame to reproduce the moving picture signal.

In the above mentioned interframe predictive coding system and decoding system, the interval (reset interval N) of independent frames among serial picture signals inputted thereto, which is to be independently coded without interframe prediction, is changed. The dependent frames located between two coded independent frames are coded with interframe predictive coding by means of the coded independent frames.

FIG. 2 shows variation of the reset interval N of independent frames where each box is a frame, the cross hatched boxes the depicting independent frames and the others dependent frames.

The reset interval N is fixed at 5 in FIG. 2(a) where independent frames are set by every five frames as described in the prior application, while it is varied from 4 to 6 in FIG. 2(b) in the present invention.

According to the present invention, the value of the reset interval N in which amount of coded data is minimum can be obtained by the intraframe coding and interframe coding with respect to FIG. 1 and then next reset timing can be obtained.

The other objects and features of this invention will become understood from the following description with reference to the accompanying drawings.

BRIEF DESCRIPTION OF DRAWINGS

FIG. 1 shows variation of overall amount of coded data by intraframe and interframe coding;

FIG. 2 shows variation of the reset interval N of independent frames;

FIG. 5 is a block diagram of a frame difference detection circuit 12 shown in FIG. 3;

FIG. 6 is a block diagram of a second preferred embodiment of an interframe predictive coding system according to the present invention;

DETAILED DESCRIPTION OF THE PREFERRED EMBODIMENTS

Figure 3:
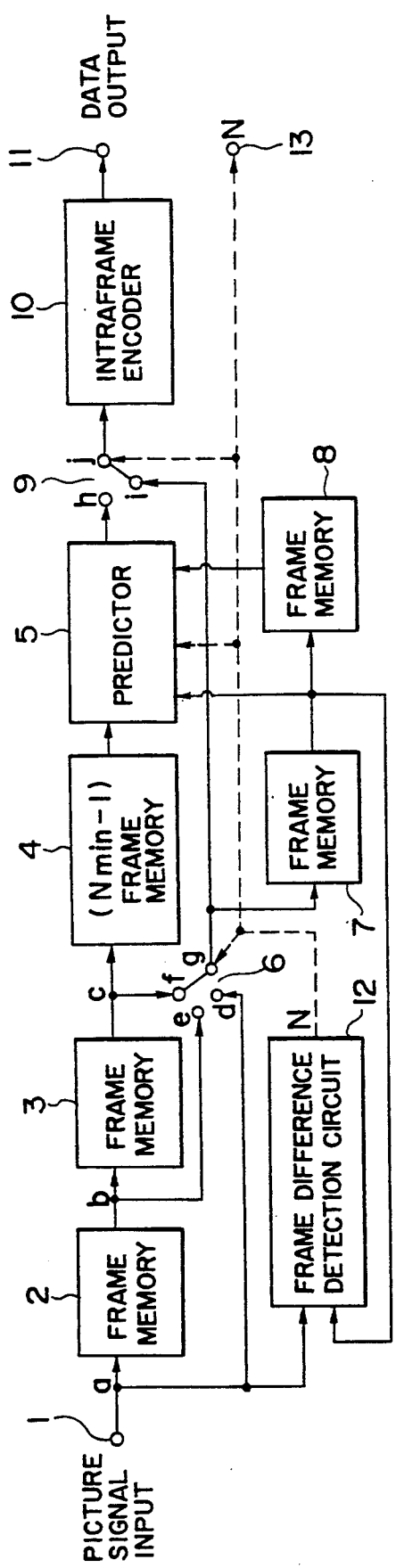
FIG. 3 is a block diagram of a first preferred embodiment of an interframe predictive coding system according to the present invention.

The present invention is now described in detail with reference to the accompanying drawings. Throughout the drawings, like reference numerals and letters are used to designate like or equivalent elements for the sake of simplicity of explanation.

FIGS. 3 and 6 show block diagrams of first and second preferred embodiments of an interframe predictive coding system according to the present invention, respectively. Basic configuration is the same in each of the figures. The only difference between them is control of a reset interval N. That is, FIG. 3 shows such control by means of frame difference, while FIG. 6 shows such control by amount of data.

The first preferred embodiment of the interframe predictive coding system according to the present invention will be described with reference to FIG. 3.

An input terminal 1 for a picture signal is connected to one of four input terminals of a predictor 5 via frame memories 2 and 3 and a (Nmin−1) frame memory 4 and is also connected to an input terminal d of a changeover switch 6.

Output terminals of the frame memories 2 and 3 are connected to input terminals e and f of the changeover switch 6, respectively. The input terminal 1 is further connected to one of two input terminals of a frame difference detection circuit 12. An output terminal of the predictor 5 is connected an input terminal h of a changeover switch 9.

The changeover switch 6 is for selecting one signal among an input signal a from the input terminal 1 and output signals b and c of the frame memories 2 and 3, respectively and is controlled by means of an information N from the frame difference detection circuit 12 at a moment of an independent frame, described later.

An output terminal g of the changeover switch 6 is connected to an input terminal of a frame memory 7 and also to an input terminal i of the changeover switch 9.

An output terminal of the frame memory 7 is connected to one of the input terminals of the predictor 5, an input terminal of a frame memory 8 and also to the other input terminal of the detection circuit 12. An output terminal of the frame memory 8 is connected to one of the input terminals of the predictor 5.

The changeover switch 9 is to switch between an output signal of the predictor 5 and the signal selected by the changeover switch 6 and is controlled by means of an information of the reset interval N from a frame difference detection circuit 12. The switch a is switched to the terminal i (the output side of the changeover switch 6) when an independent frame arrives at the frame memory 7 and to the terminal h (the output side of the predictor 5) when a dependent frame is outputted from the predictor 5, as described later. An output terminal j of the changeover switch 9 is connected to an intraframe encoder 10, the output of which is connected to a data output terminal 11.

The (Nmin−1) frame memory 4 (Nmin being an integer of 2 or more) is for encoding a dependent frame after an independent frame to be used for prediction is coded. The frame memories 7 and 8 are for producing a prediction signal (a prediction value) for dependent frames on the basis of two independent frames, i.e., prior and posterior independent frames.

Figure 4:
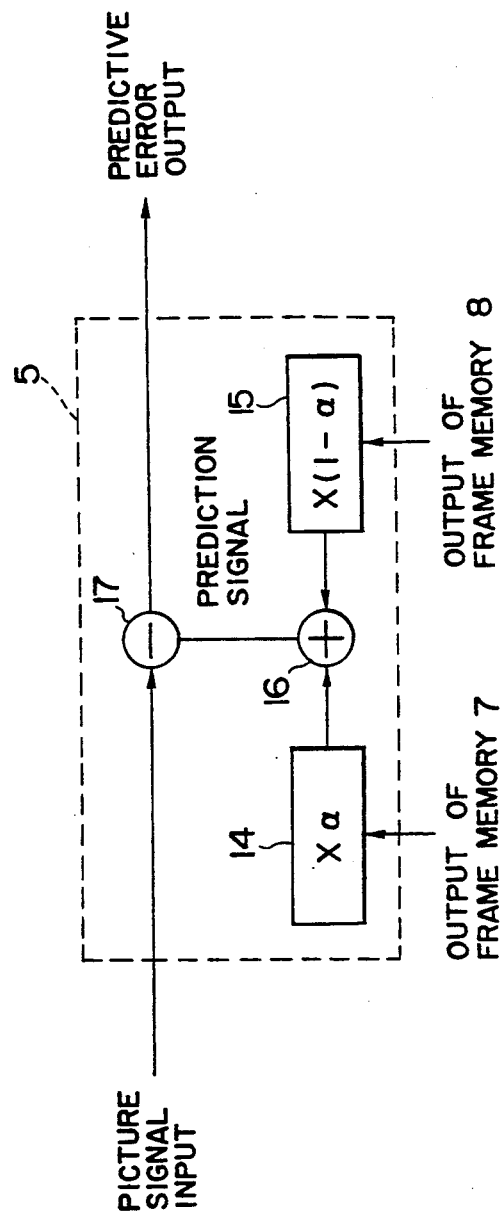
FIG. 4 is a block diagram of a predictor 5 shown in FIG. 3.

FIG. 4 is a block diagram of the predictor 5 shown in FIG. 3. There are provided coefficient multipliers 14 and 15 ($\alpha$ and $1-\alpha$ are coefficients where $0<\alpha<1$) for weighting output signals of the frame memories 7 and 8 respectively and an adder 16 for adding the output signals thus weighted and produces a prediction signal.

There is also provided a prediction signal subtracter 17 which subtracts the prediction signal from a picture signal outputted from the (Nmin−1) frame memory 4 to obtain a predictive error.

The intraframe encoder 10 shown in FIG. 3 is conventional and comprises an orthogonal transformer, a quantizer and a variable-length encoder (not shown) and an output terminal thereof is connected to the data output terminal 11.

The frame difference detection circuit 12 is for detecting frame difference between a signal (an input frame) inputted to the input terminal 1 and an output signal of the frame memory 7 (a post or new independent frame) and to produce the information of the reset interval N as a control signal for switching the changeover switches 6 and 9.

An output terminal 13 is the information N output terminal for transferring the information N to a decoding system.

In FIG. 3, a dependent frame of a moving picture signal a (composed of serial frames) inputted from the input terminal 1 is totally delayed by (Nmin+2) frames in the frame memories 2 and 3 and the (Nmin−1) memory 4, because contents at least of the (Nmin−1) memory 4 are not rewritten during one frame duration when an independent frame branches off to the frame memory 7 via the changeover switch 6, as will be described later.

Here, N=Nmin when the output signal c of the frame memory 3 is selected by the changeover switch 6, N=Nmin+1 when the output signal b of the frame memory 2 is selected and N=Nmin+2 when the input signal is selected. Nmin is the minimum value of a variable N (a value representing a frame interval), for example, if Nmin=4, above N's are 4, 5 and 6, respectively.

Selecting operation of the changeover switch 6 is performed only when the independent frame arrives thereat, the independent frame being set by one frame at every N frame interval. A selected picture signal is not inputted to any of the frame memories 2, 3 and 4 but to the frame memory 7 and is stored therein.

In other words, what are stored in the frame memories 3 and 4 will not be rewritten when the output of the frame memory 2 is selected as the independent frame, and that in the frame memory 4 will not be rewritten when the output of the frame memory 3 is selected.

In this case, the picture signal already stored in the frame memory 7 is transferred to the frame memory 8 which is then rewritten. The picture signal stored in the frame memories 7 and 8 and used for prediction is an original picture signal inputted from the input terminal 1 in this embodiment. However, a picture signal obtained from the output of the intraframe encoder 10 by local decoding also may be used for prediction.

The signal selected by the changeover switch 6 is inputted to the changeover switch 9. The switch 9 is switched to the terminal i side in FIG. 3 when the independent frame is selected so that the selected signal is passed therethrough and inputted to the intraframe encoder 10.

Intraframe coding is performed in the intraframe encoder 10 so as to remove spatial redundancy from the selected signal. The intraframe encoder 10 produces a compressed coded data which is then outputted from the data output terminal 11. The intraframe coding performed in the intraframe encoder 10 is the combination of orthogonal transform such as discrete cosine transform and variable-length coding such as Huffman coding.

A dependent frame objective to interframe prediction is passed through the frame memories 2 and 3 and (Nmin−1) frame memory 4 to be the output, which is delayed by (Nmin+2) frames, of the (Nmin−1) frame memory 4. This output is then inputted to the predictor 5.

In the predictor 5, picture signals of two prior and posterior independent frames outputted from the frame memories 7 and 8 are weighted corresponding to a position of a dependent frame to be predicted on the time base from those frames to produce a predictive picture signal. The predictive picture signal is subtracted from the inputted picture signal to produce a predictive error picture signal. Weighting by the position of the time base is also made to correspond to N which is variable.

The predictive error picture signal outputted from the predictor 5 is passed through the changeover switch 9 since the switch 9 is switched to terminal h side at a moment of this dependent frame outputted from the predictor 5 and is inputted to the intraframe encoder 10.

Intraframe coding is performed in the intraframe encoder 10 to produce a compressed data which is then outputted from the output terminal 11. This intraframe coding is towards the predictive error picture signal so that amount of data thus coded by the intraframe coding is greatly reduced compared to independent frame coding in which a picture signal is directly coded.

Reset interval control (control by means of frame difference) which is a feature of the first preferred embodiment will be described.

Degree of movement of a picture is detected by the frame difference detection circuit 12. The frame difference is the difference between the picture signal of the input frame inputted from the input terminal 1 and the output signal of the newer independent frame (last selected and memorized independent frame) of the frame memory 7.

Accordingly, it is judged whether interframe prediction, in which an independent frame and a predictive frame are distant from each other, can be done adequately. The frame difference also may be the difference of a picture signal of an inputted frame and the output signal of the frame memory 2.

FIG. 5 is a block diagram of the frame difference detection circuit 12. What is done in the detection circuit 12 is square-law error computation. In the detection circuit 12, two input picture signals (a present a picture signal and picture signal having a difference from the present picture signal by 1 to N−1 frames) are subtracted from each other in a subtracter 21 to obtain the difference pixel by pixel. The difference is squared by a squaring circuit 22 and is further integrated by one frame by an integration circuit 23 to obtain a frame difference value which circuit is to be frame-reset.

If motion compensation is performed in the predictor 5, there will be provided a motion vector estimation circuit 25 which detects motion vectors between both input picture signals and a motion compensation circuit 26 for motion compensation by means of motion vectors estimated before the difference is obtained by the substractor 21.

The difference (frame difference) value thus obtained corresponds to an interframe predictive error picture signal and is substantially proportional to the amount of interframe-coded data.

The frame difference value thus obtained is compared to a preset reference value in an N-judgement circuit 24. N is made smaller (that is, the independent frame interval is made smaller) if the frame difference value is larger than the reference picture signal, while N is made larger (that is, the independent frame interval is made larger) if the former is smaller than the latter. The information of N is then outputted.

N thus obtained is memorized only while a dependent frame is interframe-coded and controls the timing for selecting a next independent frame (that is, switching of the changeover switches 6 and 9). Further the information of N is transferred to a decoding system which will be described later via the output terminal 13.

Next, the second preferred embodiment of the interframe predictive coding system will be described with reference to FIG. 6. The difference of FIG. 6 from FIG. 3 is only that a data-amount observation circuit 31 is provided instead of the frame difference detection circuit 12.

The compressed data (coded data) outputted from the intraframe encoder 10 is inputted to the data-amount observation circuit 31 in which the amount of coded-output data of an independent frame and that of a dependent frame are observed to produce an information of reset interval N corresponding to the amount of coded-output data of each frame, as a switching control signal of the changeover switches 6 and 9.

The operation of the second preferred embodiment shown in FIG. 6 is the same as that of the first preferred embodiment shown in FIG. 3 except for the reset interval control described later, so that explanation of such operation will be omitted.

The reset interval control (control by means of amount of data) will be described. The data-amount observation circuit 31 observes the balance of the amount of coded data outputted from the intraframe encoder 10 by means of intraframe coding and that by interframe coding.

Amount of data of an independent frame by intraframe coding and that of a dependent frame by interframe coding are observed in the data-amount observation circuit 31, respectively.

As the result of observation, N is made large (an independent frame interval is made large) if the amount of data by intraframe coding is larger than that by interframe coding, while N is made small (the independent frame interval is made small) if the former is smaller than the latter. The information of N is then outputted.

In a definite way, N is judged by comparing the ratio of the amount of data by intraframe coding to that by interframe coding and a preset reference value. Since the amount of data is usually observed for control thereof in the coding, a simple comparing circuit is sufficient for this second preferred embodiment.

N thus obtained is memorized only while a dependent frame is interframe-coded and controls the timing for selecting a next independent frame (switching of the changeover switches 6 and 9). The information of N is then transferred to a decoding system which will be described later via an output terminal 13.

Figure 7:
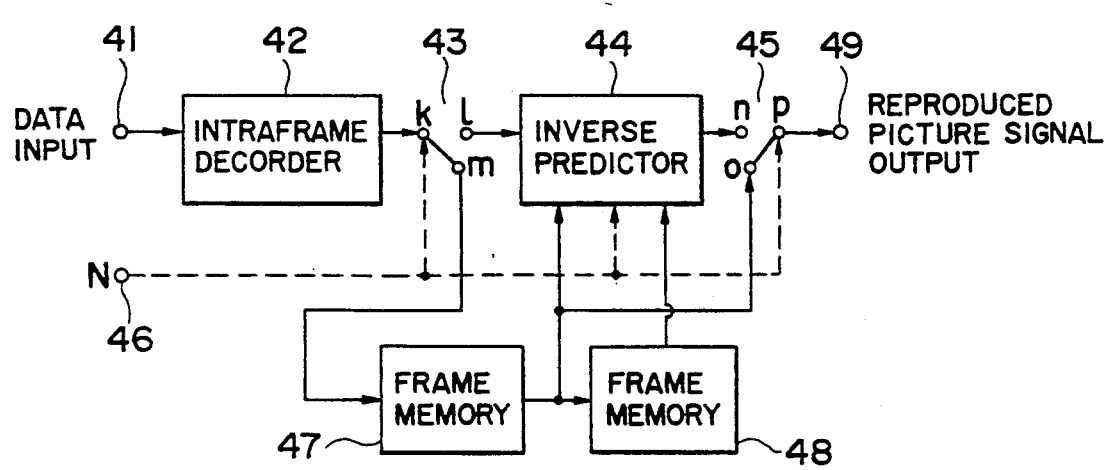
FIG. 7 is a block diagram of a first preferred embodiment of a decoding system according to the present invention.

FIG. 7 shows a block diagram of a first preferred embodiment of a decoding system according to the present invention.

A data input terminal 41 is connected to an intraframe decoder 42 comprising such as a variable-length code decoder, de-quantizer and an orthogonal reverse transformer (not shown). The output of the intraframe decoder 42 is connected to an input terminal k of a changeover switch 43.

An output terminal l of the changeover switch 43 is connected is connected to one of four input terminals of an inverse predictor 44, while the other output terminal m to an input terminal of a frame memory 47.

The changeover switch 43 is to input an input signal (an output signal of the intraframe decoder 42) to the inverse predictor 44 or to frame memory 47 and is switched to the m terminal side (the input side of the frame memory 47) at a moment of an independent frame outputted from the intraframe decoder 42 and to the l terminal side (the input side of the inverse predictor 44) at a moment of a dependent frame outputted from the intraframe decoder 42.

An output terminal of the inverse predictor 44 is connected to an input terminal n of a changeover switch 45. An output terminal of the frame memory 47 is connected to one of the input terminals of the inverse predictor 44 and an input terminal of a frame memory 48 and also to the other input terminal o of the changeover switch 45. An output terminal of the frame memory 48 is connected to one of the input terminals of the inverse predictor 44.

The frame memories 47 and 48 are for producing a predictive picture signal (a prediction value) on the basis of picture signals of two prior and posterior independent frames.

Figure 8:
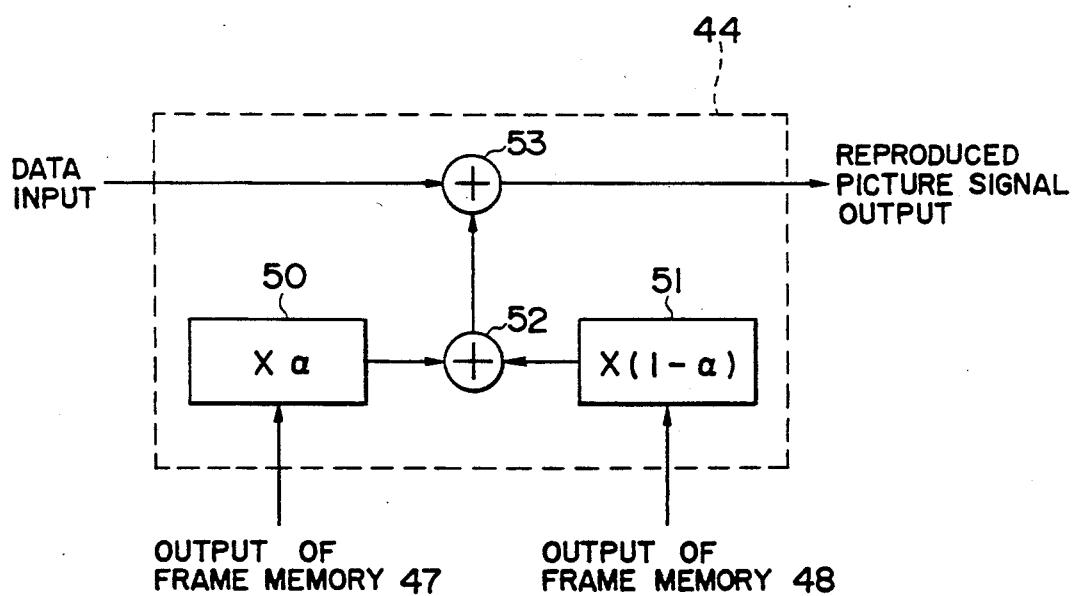
FIG. 8 is a block diagram of an inverse predictor 44 shown in FIG. 7.

FIG. 8 is a block diagram of the inverse predictor 44. There are provided two coefficient multipiers 50 and 51 ($\alpha$ and $1-\alpha$ are coefficients where $0<\alpha<1$) for weighting output signals of the frame memories 47 and 48 respectively and an adder 52 for adding the output signals thus weighted and produces a predictive picture signal.

There is also provided a predictive picture signal adder 53 which adds the predictive picture signal to a predictive error picture signal inputted thereto via the changeover switch 43 from the intraframe encoder 42 to reproduce a picture signal.

The changeover switch 45 is for switching between an output signal of the inverse predictor 44 and that of the frame memory 47 and is controlled by means of an information N from the coding system already described via an input terminal 46, the same as the changeover switch 43, to be switched to the terminal o (the output side of the frame memory 47) at a moment of an independent frame outputted from the frame memory 47 and to the terminal (the output side of the inverse predictor 44) at a moment of a dependent frame outputted from the inverse predictor 44. An output terminal p of the changeover switch 45 is connected to a reproduced picture signal output terminal 49.

Basic operation of the above mentioned decoding system is the same as the prior application except the changeover switches 43 and 45 are switched by means of the information N. This means that basic configuration of the decoding system and a number of frame memories are not changed even if N is changed.

In FIG. 7, compressed data inputted from the input terminal 41 is intraframe-decoded by the intraframe decoder 42 so that compressed data of an independent frame becomes a reproduced picture signal. This signal is inputted to the frame memory 47 and stored therein via the changeover switch 43 since the switch 43 is switched to the terminal m side at a moment of the independent frame arriving at the intraframe decoder 42.

At the same time, a picture signal already stored in the frame memory 47 is transferred to the frame memory 48 and is also outputted from the output terminal 49 via the changeover switch 45 which is switched to the terminal o at a moment when the independent frame is outputted from the frame memory 47.

With respect to the dependent frame to be interframe-coded, a predictive error picture signal from the intraframe decoder 42 is transferred to the inverse predictor 44 via the changeover switch 43 which is switched to the terminal 1 at a moment when the dependent frame is outputted from the intraframe decoder 42.

The predictive picture signal, the same as produced in the encoding system already described, is added to the predictive error picture signal in the inverse predictor 44 which then produces a reproduced picture signal. The signal is outputted from the output terminal 49 via the changeover switch 45 which is switched to the terminal n at a moment when the dependent frame is outputted from the inverse predictor 44.

The data including a picture signal of an independent frame is transferred ahead of that of a dependent frame to the decoding system, so that a reproduced picture signal of the independent frame is outputted from the frame memory 47 after being delayed by N frames in order to compensate such transfer of the picture signal of the independent frame ahead of that of the dependent frame. This means that the frame memory 47 is also used for time compensation.

While the presently preferred embodiments of the present invention have been shown and described, it is to be understood these disclosures are for the purpose of illustration and that various changes and modifications may be made without departing from the scope of the invention as set forth in the appended claims.

What is claimed is:

1. An interframe coding system for a moving picture signal composed of serial frames which are independent frames being subjected to intraframe coding and dependent frames being subjected to interframe coding, comprising:
   varying means for varying an interval between two of the independent frames;
   prediction means for producing each of a plurality of predictive picture signals on the basis of said two independent frames, the interval therebetween thus varied, located before and after a dependent frame to be predicted among said dependent frames and subtracting said predictive picture signals from picture signals of said dependent frames to produce predictive error picture signals, respectively; and
   intraframe coding means for coding said picture signals of said independent frames and said predictive error picture signals.

2. The system according to claim 1, wherein the varying means further comprises:
   detection means for subtracting picture signals of two serial frames among the frames from each other to detect a frame difference picture signal; and
   adjusting means for comparing said frame difference picture signal and a preset reference signal with each other to narrow the interval if the former is greater than the latter and widen the interval if the former is smaller than the latter.

3. The system according to claim 1, wherein the varying means further comprises adjusting means for comparing a preset reference value and ratio of amount of data obtained by coding said predictive error picture signals to amount of data obtained by coding the picture signals of said independent frames to narrow the interval if the former is greater than the latter and widen the interval if the former is smaller that the latter.

4. A decoding system for decoding data obtained by coding a moving picture signal composed of independent frames being subjected to intraframe coding and dependent frames being subjected to intraframe predictive coding by coding predictive error picture signals, said independent frames being set under intervals among the dependent frames, to reproduce the moving picture signal, comprising:
   decoding means for decoding the data to reproduce picture signals of said independent frames and said predictive error picture signals;
   inverse predictive means for producing each of a plurality of predictive picture signals on the basis of two of said independent frames located before and after a dependent frame to be predicted among said dependent frames and adding the predictive picture signals to the predictive error picture signals to reproduce picture signals of the dependent frames, respectively; and
   reproduction means for serially outputting the picture signals of the independent frames and the reproduced picture signals of the dependent frames to reproduce the moving picture signal.

* * * * *